(12) United States Patent
Danagher et al.

(10) Patent No.: US 7,014,326 B2
(45) Date of Patent: Mar. 21, 2006

(54) WAVELENGTH BLOCKER

(75) Inventors: David John Danagher, Nepean (CA); Thomas Ducellier, Ottawa (CA); Robert I. MacDonald, Manotick (CA); Jasvinder Obhi, Nepean (CA); Barrie Keyworth, Stittsville (CA); Paul H. Beckwith, Ottawa (CA); W. John Tomlinson, Princeton, NJ (US)

(73) Assignees: JDS Uniphase Corporation, San Jose, CA (US); JDS Uniphase Inc., (CA)

( * ) Notice: Subject to any disclaimer, the term of this patent is extended or adjusted under 35 U.S.C. 154(b) by 56 days.

(21) Appl. No.: 10/237,136

(22) Filed: Sep. 9, 2002

(65) Prior Publication Data

US 2003/0108284 A1 Jun. 12, 2003

Related U.S. Application Data

(60) Provisional application No. 60/317,935, filed on Sep. 10, 2001.

(51) Int. Cl.
*G02B 26/00* (2006.01)
*G02B 27/44* (2006.01)
*H04J 14/02* (2006.01)

(52) U.S. Cl. ............... 359/615; 359/295; 398/83; 349/196

(58) Field of Classification Search ............... 359/615, 359/337.1, 337.2; 349/193, 196, 197, 18; 398/49, 83, 84
See application file for complete search history.

(56) References Cited

U.S. PATENT DOCUMENTS

| | | | |
|---|---|---|---|
| 4,707,056 A | 11/1987 | Bittner | 350/96.12 |
| 5,875,271 A | 2/1999 | Laughlin | 385/16 |
| 5,943,158 A | 8/1999 | Ford et al. | 359/295 |
| 5,960,133 A | 9/1999 | Tomlinson | 385/18 |
| 6,275,320 B1 | 8/2001 | Dhuler et al. | 359/237 |
| 6,320,996 B1 | 11/2001 | Scobey et al. | 385/18 |
| 6,327,019 B1 * | 12/2001 | Patel et al. | 349/196 |
| 6,389,188 B1 | 5/2002 | Scobey et al. | 385/18 |
| 6,396,975 B1 | 5/2002 | Wood et al. | 385/18 |
| 6,433,911 B1 | 8/2002 | Chen et al. | 359/222 |
| 6,438,283 B1 | 8/2002 | Karaguleff | 385/18 |
| 6,498,872 B1 * | 12/2002 | Bouevitch et al. | 385/24 |
| 6,532,318 B1 * | 3/2003 | Brophy et al. | 385/17 |
| 6,567,574 B1 * | 5/2003 | Ma et al. | 385/16 |
| 6,658,212 B1 * | 12/2003 | Trutna et al. | 398/84 |

(Continued)

FOREIGN PATENT DOCUMENTS

EP 1 126 294 A2 8/2001

(Continued)

OTHER PUBLICATIONS

U.S. Appl. No. 60/238,756.*

(Continued)

Primary Examiner—John Juba, Jr.
(74) Attorney, Agent, or Firm—Allen, Dyer, Doppelt, Milbrath & Gilchrist, P.A.

(57) ABSTRACT

A wavelength blocker including an input port for launching an input beam of light, first dispersing means for dispersing the input beam of light according to wavelength, an array of independently addressable elements for selectively blocking a portion of the dispersed beam of light, second dispersing means for receiving the passed dispersed beam of light and for producing a single multiplexed beam of light therefrom, and an output port for transmitting a modified output beam of light. The array of independently addressable elements are designed such that the wavelength blocker is capable of blocking a variable number of non-consecutive channels without significantly affecting the unblocked channels.

31 Claims, 11 Drawing Sheets

U.S. PATENT DOCUMENTS

| | | | |
|---|---|---|---|
| 6,678,445 B1 * | 1/2004 | Tomlinson et al. | 385/37 |
| 2002/0009257 A1 | 1/2002 | Bouevitch et al. | 385/24 |
| 2002/0063929 A1 | 5/2002 | Huber | 359/154 |
| 2003/0058516 A1 * | 3/2003 | Scott et al. | 359/246 |
| 2003/0058517 A1 * | 3/2003 | Lindquist et al. | 359/247 |
| 2003/0086139 A1 * | 5/2003 | Wing So | 359/130 |
| 2004/0105619 A1 * | 6/2004 | Weaver et al. | 385/37 |

FOREIGN PATENT DOCUMENTS

| | | |
|---|---|---|
| GB | 2 027 546 A | 2/1980 |
| WO | WO 99/21123 A | 4/1999 |
| WO | WO 01/90798 A2 | 11/2001 |

OTHER PUBLICATIONS

F.H. Yu et al., "New Reflective Liquid Crystal Display Modes", Proceedings of the Fourth Asian Symposium on Information Display, Hong-Kong, Feb. 13-14, 1997, pp. 207-210.

* cited by examiner

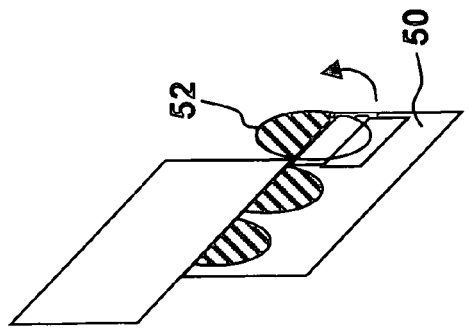
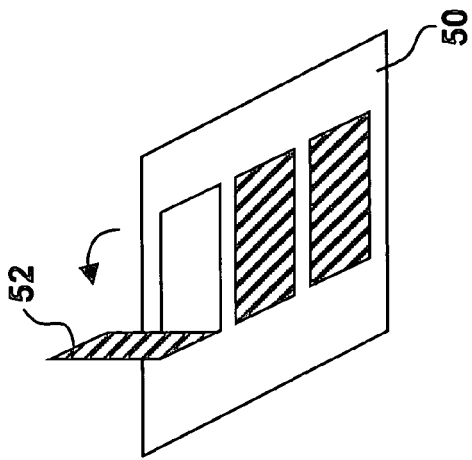
FIG. 4A
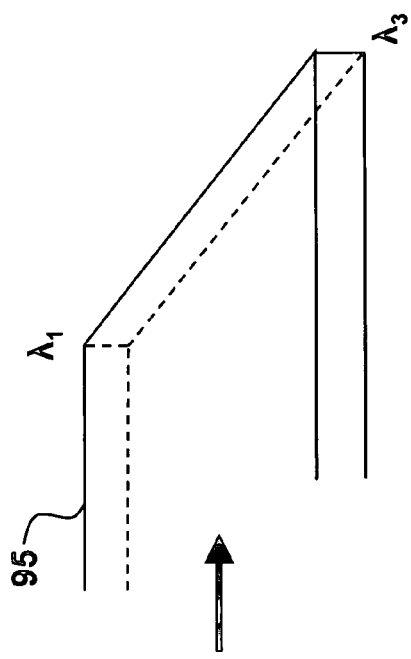
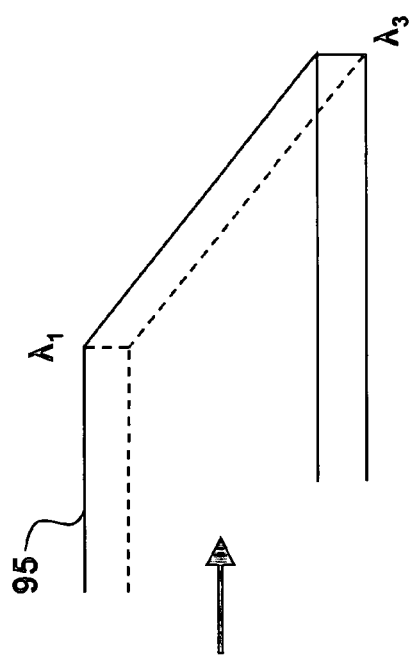
FIG. 4B

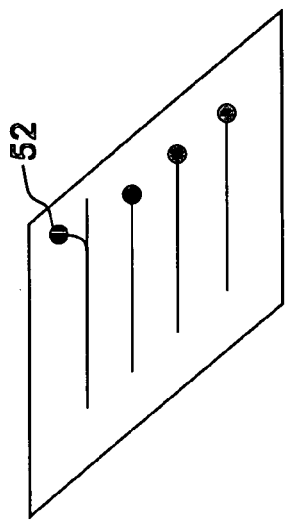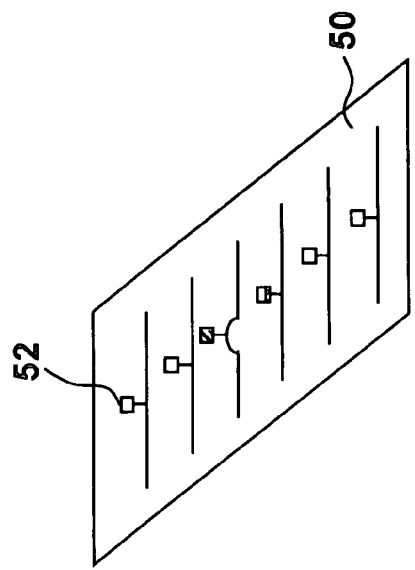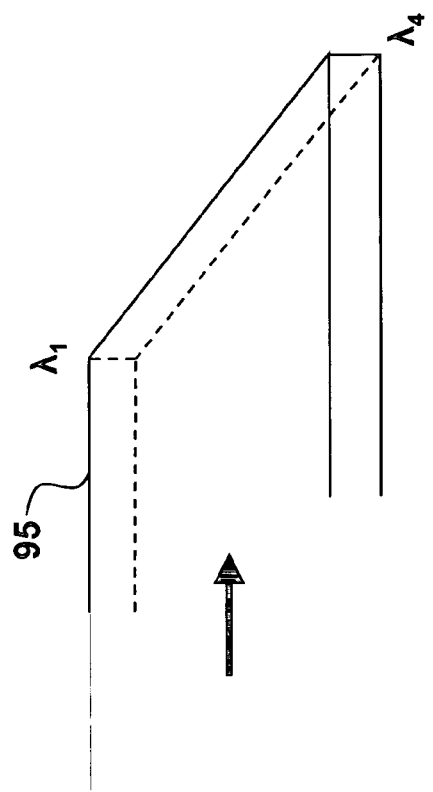
FIG. 4C
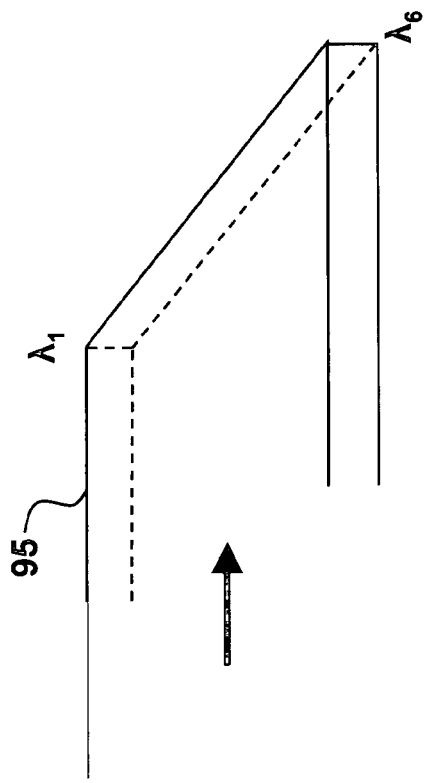
FIG. 4D

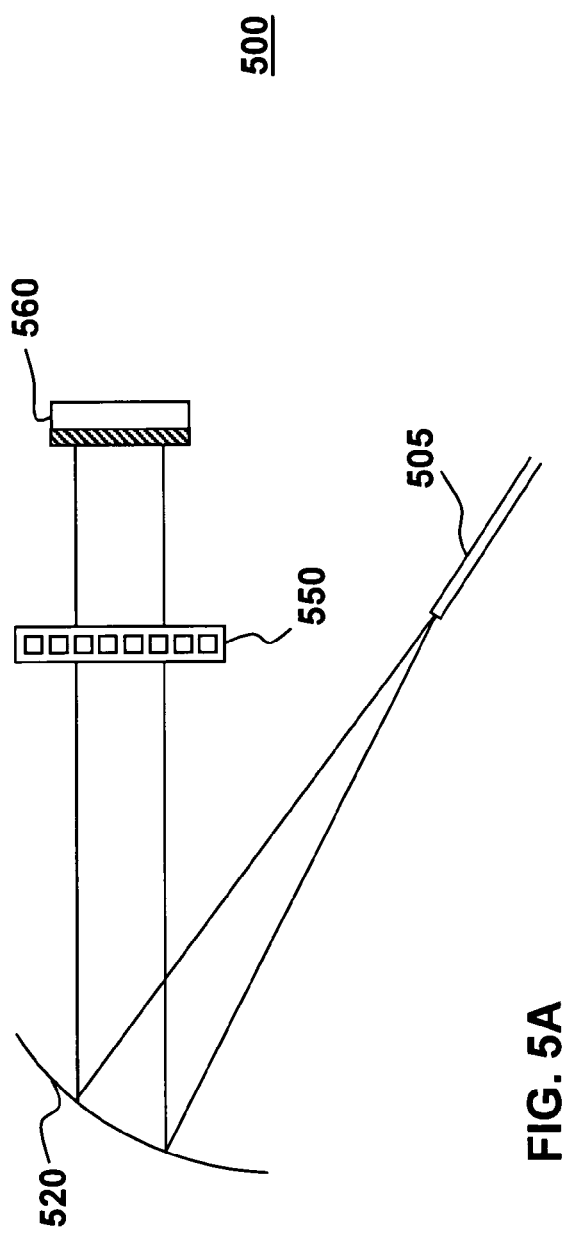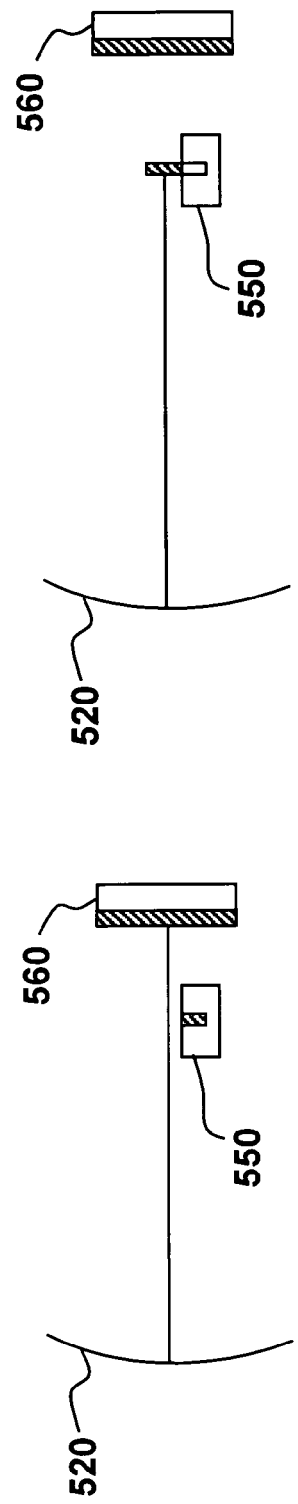

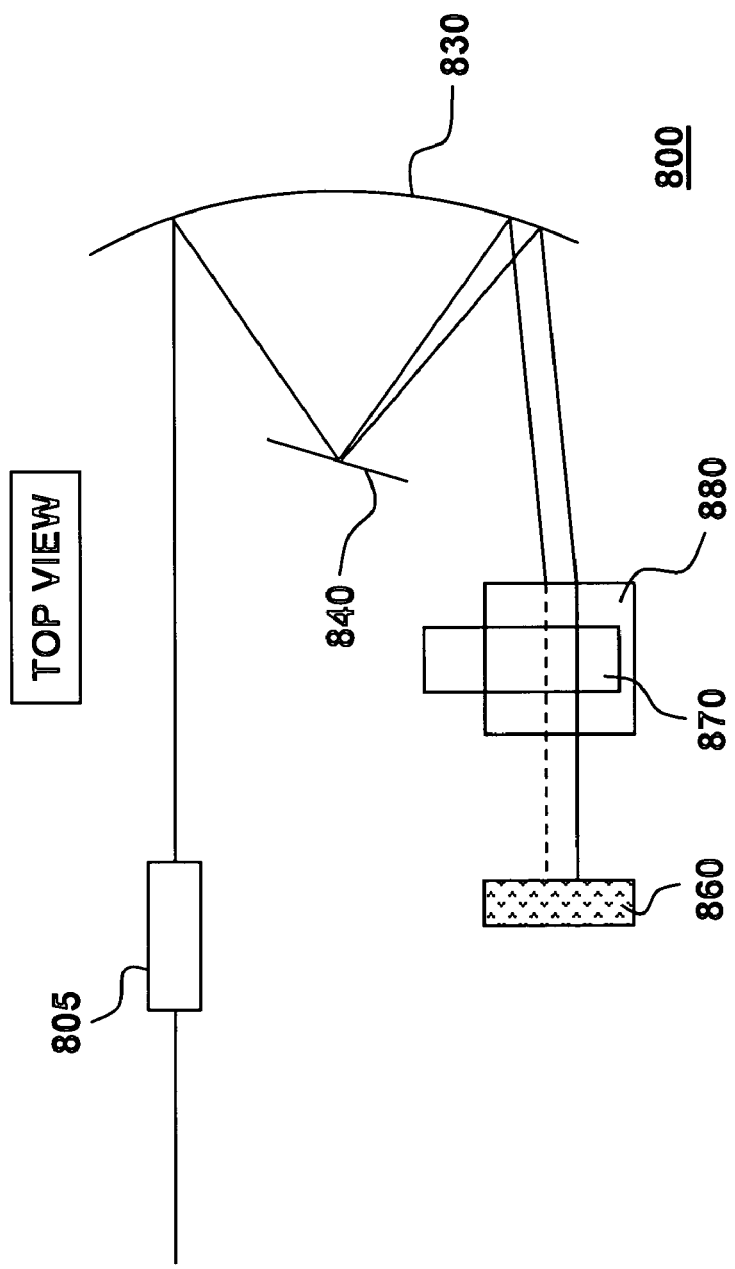

WAVELENGTH BLOCKER

CROSS-REFERENCE TO RELATED APPLICATIONS

This application claims priority from Provisional Appl. No. 60/317,935 filed on Sep. 10, 2001.

FIELD OF THE INVENTION

The present application relates to optical switches, and in particular to a wavelength blocker.

BACKGROUND OF THE INVENTION

In optical wavelength division multiplexed (WDM) communication systems, a single optical waveguide simultaneously carries many different communication channels in light of different wavelengths. In general, each communication channel is assigned a nominal centre wavelength, and the channel spacing, or separation, is defined for the network. The closer the channel spacing, the greater the number of channels that may be transmitted over an optical fiber of the network. The International Telecommunications Union has proposed Dense WDM (DWDM) network standards with optical signal channels having a frequency separations of 25, 50, and 100 GHz (equivalent to a wavelength separation of about 0.2, 0.4 and 0.8 nm, respectively). Lower frequency separations are envisioned.

Accordingly, the performance requirements for DWDM networks (such as those for bandwidth, cross talk, polarization dependent loss, polarization mode dispersion, and insertion loss) are becoming more stringent. In addition to the above problems, selective routing is difficult in DWDM communication systems because of the limitations introduced by conventional optical switches.

Conventional optical switches are typically based on optical-electrical-optical (OEO) technologies. In an OEO scheme, the optical signal is transduced into an electrical signal, the signal is switched electrically, and is reconverted back into a new optical beam. Unfortunately, the OEO conversion is limited by the processing speed of the available electronics. Furthermore, OEO devices are dependent on wavelength, modulation format, and modulation frequency.

More recently, there as been increased interest in all-optical switching, in which one or more wavelengths are selectively switched without the need to convert the optical signals to an electronic signal. Micro-electro-mechanical systems (MEMS) have played an important part in all-optical switching since these miniature actuators can be designed to simultaneously switch spatially resolved portions of the optical signal independently from each other. Furthermore, MEMS devices can be designed to be compact, have a low power consumption, and can be mass produced to produce a low cost switch. Liquid crystal (LC) modulators have played an important role in all-optical switching for similar reasons.

In many prior art switches using MEMS or LC modulators, the switch includes a dispersive element to spatially separate the multiplexed beam of light into individual communication channels, which are independently modified by the modulator. The dispersive element is typically a reflective or transmissive diffraction grating used in either a single pass or double pass configuration. For example, in the single pass configuration a first diffraction grating performs the demultiplexing while a second diffraction grating performs the multiplexing. In the double pass configuration, a single diffraction grating is combined with a reflector to provide demultiplexing in a first pass therethrough and multiplexing in the second pass therethrough.

However, since each communication channel is generally incident on a separate element or pixel of the MEMS or LC modulator, a small portion of the optical signal is lost due to the gaps between discrete pixels. In particular, the opaque gaps between pixels in LC modulators and/or the space between reflectors in MEMS modulators removes (e.g., blocks) a portion of the dispersed spectrum. This creates a spectral ripple in either amplitude or phase of the optical signal. When the transmission signal passes through more than one of these switches, the spectral ripple accumulates and causes significant transmission errors. For example, a significant narrowing of bandwidth is observed.

In an attempt to obviate the bandwidth narrowing associated with cascading multiple switch devices, U.S. Pat. Nos. 6,389,188 and 6,320,996 to Scobey et al., incorporated herein by reference, propose an all-optical switch that only wavelength de-multiplexes/multiplexes the optical channels to be switched, with minimal signal degradation to the express channels. However, the proposed switch is limited by the wavelength range of the filter used therein, and cannot be reconfigured without physically modifying the device. In other words, this switch is unable to switch a variable number of non-consecutive channels.

In U.S. Pat. No. 5,943,158 to Ford et al., incorporated herein by reference, there is disclosed an attenuator based on a mechanical anti-reflection switch (MARS) that provides a continuous, uniform optical surface. However, this device is not suitable for use in a wavelength selective switch since it is limited by the mechanical properties of the continuous membrane. More specifically, the non-discrete properties of the mechanical membrane result in a coupling between the controls exercised by nearby electrodes, and limits the achievable spatial and hence wavelength resolution.

SUMMARY OF THE INVENTION

It is an object of the present invention to provide a switch that obviates the above disadvantages.

It is further object of the present invention to provide a switch for blocking selective wavelength channels in an optical communication signal without significantly affecting the other wavelength channels.

It is yet a further object of the present invention to provide a switch, and in particular a wavelength blocker, that is able to block a variable number of non-consecutive channels.

Preferably, the wavelength blocker uses an array of discrete blocking elements, wherein the array is positioned and/or designed such that the spaces between discrete blocking elements do not substantially affect the channels not being blocked or switched. For example, in one embodiment the discrete array is positioned between a first and a second dispersive element, or between a dispersive element and a reflector, such that only the discrete element(s) of the array for dropping a predetermined channel are within, or intercept, the optical path of any of the spatially separated sub-beams of light transmitted from the dispersive element. In another embodiment, the array is substantially transparent except for the activated discrete elements used for dropping the predetermined channel or channels.

In accordance with the invention there is provided a wavelength blocker comprising an input port for launching an input beam of light having a plurality of wavelength channels, first dispersing means disposed for spatially separating the input beam of light into a plurality of sub-beams of light, each sub-beam of light corresponding to a different wavelength channel, an array of discrete, independently addressable elements, each independently addressable element for selectively blocking a sub-beam of light from the plurality of sub-beams, second dispersing means for receiving unblocked sub-beams of light and for producing a single multiplexed beam of light therefrom, and an output port for outputting the multiplexed beam of light, wherein the array is designed such that all wavelengths that are not blocked are passed to the output port, including wavelengths between unblocked adjacent wavelength channels.

In accordance with the invention there is provided a wavelength blocker comprising an input port for launching an input beam of light corresponding to an input optical signal having a plurality of wavelength channels, first dispersing means disposed for dispersing the input beam of light into a plurality of sub-beams of light, each sub-beam of light corresponding to a different wavelength channel, an array of independently addressable elements, each independently addressable element for selectively blocking a different sub-beam of light, second dispersing means for receiving unblocked sub-beams beams of light and for producing a single multiplexed beam of light therefrom and an output port for outputting an output optical signal corresponding to the single multiplexed beam of light, wherein the array is designed such that substantially no loss of signal between adjacent unblocked wavelength channels is observed in the output signal relative to the input signal.

In accordance with the invention there is provided a wavelength blocker comprising a first optical fibre for launching an input beam of light into the wavelength blocker, a spherical mirror having a focal plane for receiving the input beam of light launched from the first optical fibre and for reflecting it in a substantially backwards direction, a dispersive element disposed substantially at the focal plane of the spherical mirror for receiving the reflected beam of light and for producing a dispersed beam of light which is transmitted back to the spherical mirror, an array of discrete blocking elements disposed substantially at the focal plane of the spherical mirror, each discrete blocking element operable between a first state wherein it blocks a portion of the dispersed beam of light, and a second state wherein it passes the portion of the dispersed beam of light, and a reflector having a continuous reflecting surface for reflecting the passed portion of the dispersed beam of light back to the spherical mirror and the dispersive element such that it is output via one of the first optical fibre and a second optical fibre, wherein the array of discrete blocking elements is designed such that regions between blocking elements in the first state is substantially transparent to the input beam of light.

Notably, the wavelength blocker of the instant invention is superior to the switch devices in the prior art, since it effectively provides a tunable notch in the output spectrum. Since the wavelength blocker only notches out the wavelengths to be dropped, it is possible to cascade many of these devices one after the other with substantially no filtering or bandpass narrowing of the undropped channels.

In addition, the wavelength blocker of the instant invention is more flexible and expandable than other wavelength blockers or switches that use tunable filters and/or gratings. Advantageously, the wavelength blocker is designed such that the discrete blocking elements only affect the channels being switched. In one embodiment, up to ten percent of the channels are blocked.

BRIEF DESCRIPTION OF THE DRAWINGS

Exemplary embodiments of the invention will now be described in conjunction with the drawings in which:

FIG. 3b is a top view of a schematic diagram of a discrete blocking array for use in the wavelength blocker shown in FIG. 3a;

FIG. 4a is a schematic diagram of a discrete blocking array of a wavelength blocker in accordance with an embodiment of the instant invention;

FIG. 4b is a schematic diagram of another discrete blocking array of a wavelength blocker in accordance with an embodiment of the instant invention;

FIG. 4c is a schematic diagram of another discrete blocking array of a wavelength blocker in accordance with an embodiment of the instant invention;

FIG. 4d is a schematic diagram of yet another discrete blocking array of a wavelength blocker in accordance with an embodiment of the instant invention;

FIG. 5a is a schematic diagram of a wavelength blocker in accordance with an embodiment of the instant invention;

FIG. 5b is a side view of the wavelength blocker shown in FIG. 5a in a pass through mode of operation;

FIG. 5c is a side view of the wavelength blocker shown in FIG. 5a in a blocking mode of operation;

FIG. 7b is a top view of the blocking array shown in FIG. 7a;

FIG. 7c is a side view of the blocking array shown in FIG. 7a;

FIG. 8a is a top view of a schematic diagram of a wavelength blocker in accordance with yet another embodiment of the instant invention;

DETAILED DESCRIPTION

The instant invention provides a reconfigurable wavelength switch that allows for the modification of selected wavelength channels of a multiplexed optical signal, while the unselected channels are essentially unaffected. Since the switch allows a single wavelength channel, or various non-adjacent channels, to be blocked while the non-blocked channels are transmitted with a nearly ideal transfer function, the switch is conveniently referred to as a wavelength blocker.

Figure 1:
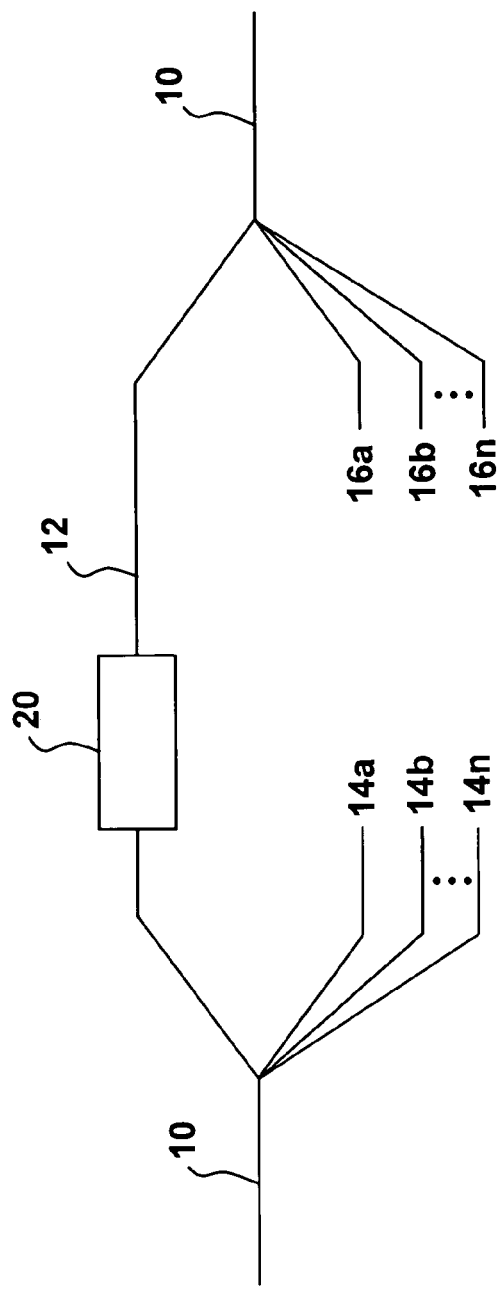
FIG. 1 is a schematic diagram illustrating a wavelength blocker used in a broadcast system for adding/dropping selected channels.

Referring to FIG. 1, there is shown a schematic diagram of a wavelength blocker used in a broadcast system for adding/dropping selected channels. The power on the trunk 10 is divided to provide an express route 12 and several drop routes 14a, 14b, . . . 14n. The wavelengths to be dropped are removed from the express route 12 by the wavelength blocker 20. Optionally, the drop channels are diverted to a predetermined drop route before the wavelength blocker. For example, each drop route is optionally provided with a tunable wavelength filter (not shown) that is dynamically configured to pass only the specified drop channel. Optionally, each drop route directs the corresponding drop channel to a photo-detector to extract the signal being dropped. The wavelengths transmitted along the express route 12 are returned to the trunk route 10, where various add channels are optionally added via add routes 16a, 16b, . . . 16n coupled to the trunk route after the wavelength blocker 20. Advantageously, any wavelength can be blocked or added independently of the other channels. Further advantageously, the output of the wavelength blocker 20 will resemble the input with one or more gaps in the spectrum.

Figure 2B:
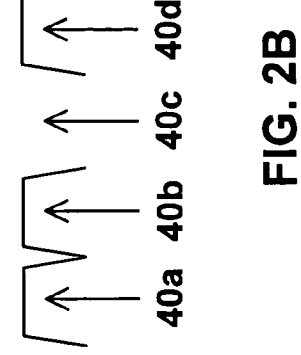
FIG. 2b is a schematic diagram of the spectral response of a prior art switch.
Figure 2A:
FIG. 2a is a schematic diagram of the spectral response of a wavelength blocker in accordance with an embodiment of the instant invention.

FIG. 2a shows a schematic spectral response of a wavelength blocker in accordance with the instant invention. The spectral response corresponds to channels 30a, 30b, 30c, 30d, 30e, and 30f wherein only one wavelength channel 30c is dropped. Notably, the express channels 30a, 30b, 30d, 30e, and 30f undergo substantially no filtering or bandwidth narrowing. In particular, the wavelength blocker does not exhibit significant channel distortion penalties. Accordingly, the wavelength blocker is ideal for cascading, for example, to provide an N×N crossbar switch. In contrast, the spectral response for a conventional optical switch, shown in FIG. 2b, exhibits gaps between express channels due to the discrete pixelation of the switch (i.e., of the MEMS or LC array) and/or the presence of filters or other spectral selection mechanisms. This additive optical approach leads to unacceptable channel filtering when the switches are cascaded.

Figure 3A:
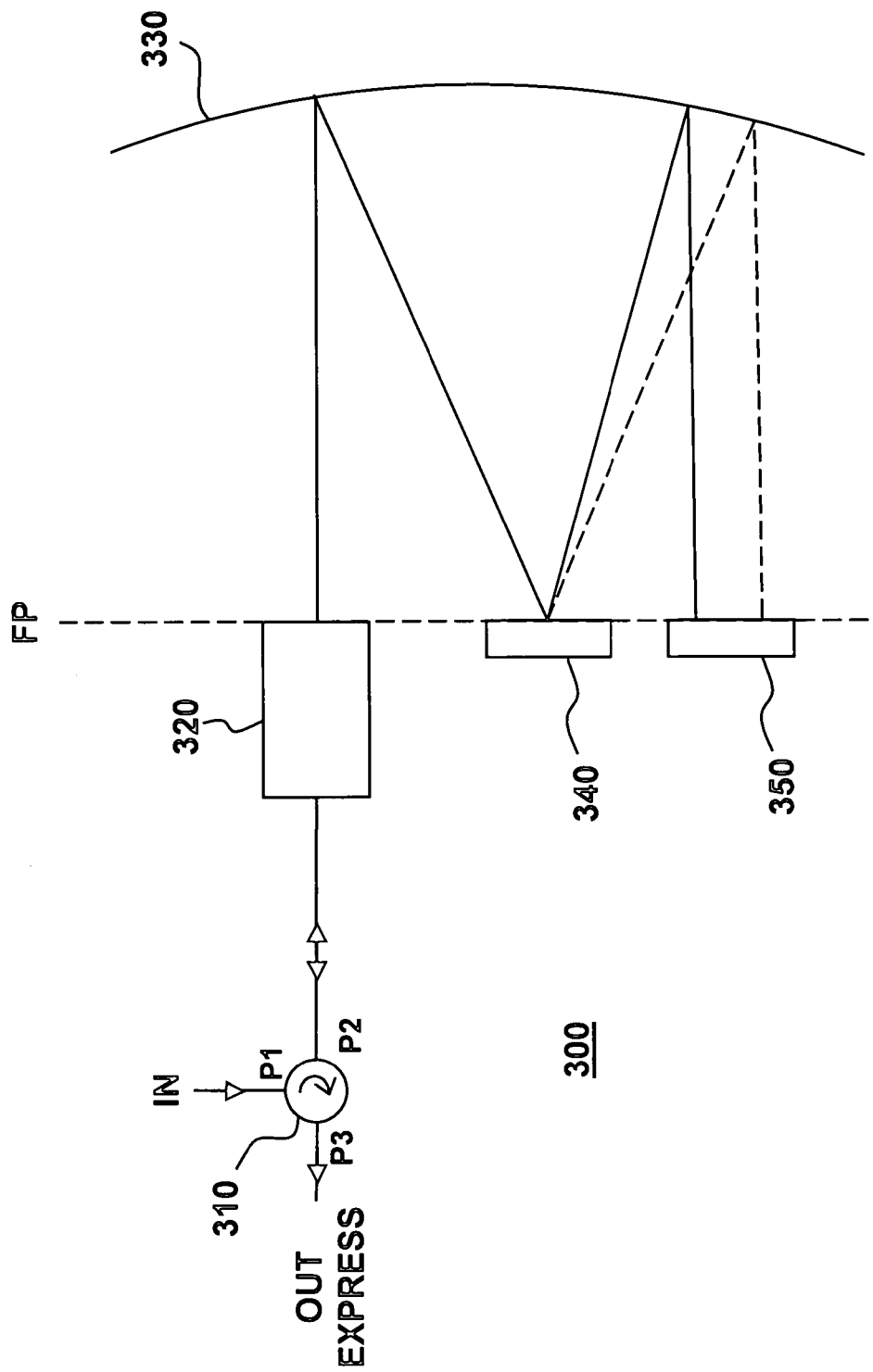
FIG. 3a is a top view of a schematic diagram of a wavelength blocker in accordance with an embodiment of the instant invention.

Referring to FIG. 3a, there is shown a schematic diagram of a wavelength blocker in accordance with one embodiment of the invention. The wavelength blocker 300 includes a circulator 310, a GRIN lens 320, a spherical mirror 330, a diffraction grating 340, and a discrete array of controllable elements 350. Preferably, the GRIN lens 320, diffraction grating 340, and discrete array of controllable elements 350 are disposed substantially at the focal plane FP of the spherical mirror 330. Preferably, a polarization diversity unit (not shown) is coupled to the GRIN lens 320 to separate two orthogonally polarized components of the input beam of light and convert them to two spatially parallel sub-beams of light having identical polarizations while within the wavelength blocker. For example, polarization diversity units including half-wave plates and/or birefringent crystals such as those disclosed in U.S. Pat. Appl. No. 20020009257 incorporated herein by reference, are known in the art and are not discussed further. The polarization diversity unit is preferably positioned before or after the GRIN lens 320.

Figure 3B:
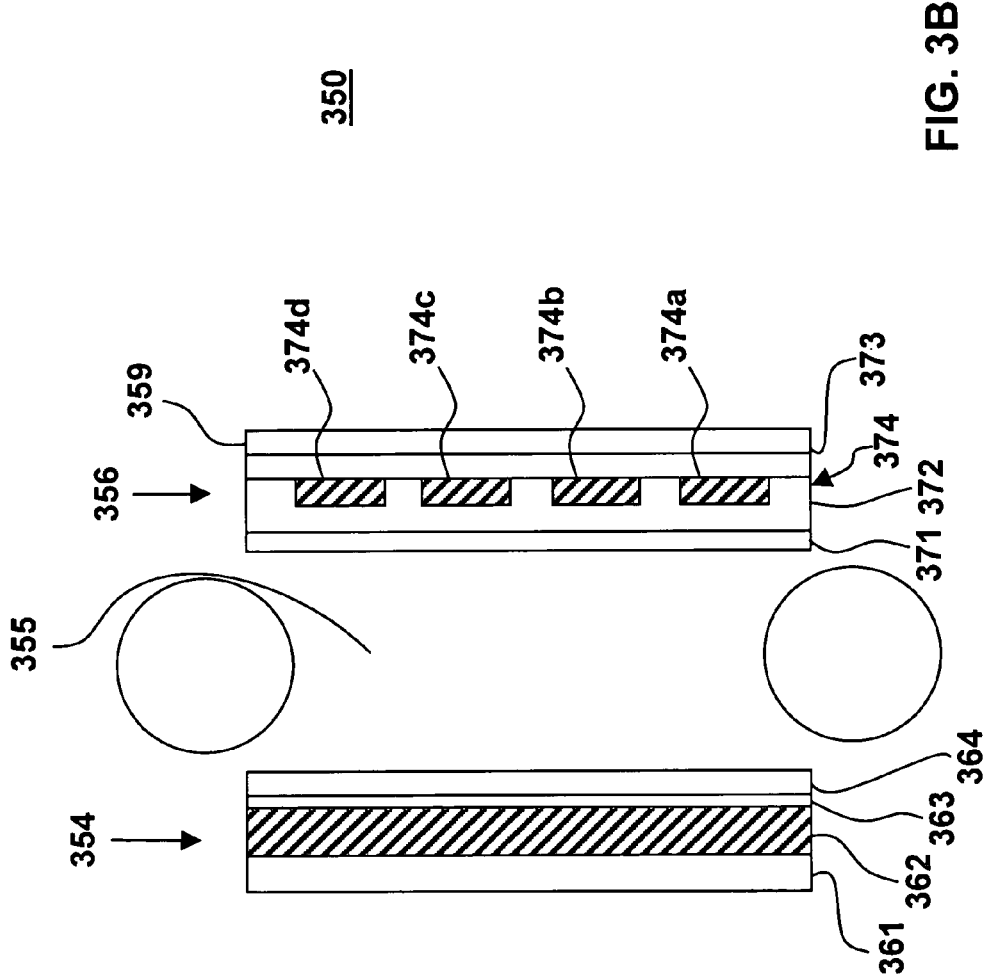

Referring to FIG. 3b, the discrete array of controllable elements 350 includes a first electrode substrate 354, a second electrode substrate 356 spaced apart from the first electrode substrate, for example by a pair of spacer balls, and a layer of liquid crystal 355 between the first 354 and second 356 electrode substrates. Preferably, the liquid crystal is a nematic liquid crystal. The first electrode substrate 354 includes a transparent substrate 361, a continuous reflective electrode 362, such as a thin layer of gold or silver, deposited on the substrate 361, an isolation film 363 deposited on the continuous electrode 362, and an alignment layer 364 deposited on the isolation film 363. The second electrode substrate 356 includes a transparent substrate 373, a patterned layer of transparent conductive material 374, such as indium tin oxide (ITO), deposited on the transparent substrate 373, an isolation film 372 deposited on patterned layer 374, and an alignment layer 371 deposited on the isolation film 372. A fixed waveplate 359 is optionally coupled to the second electrode 356. The alignment layers 364, 371, which in one embodiment are polymer films, are processed to define a preferred alignment for the liquid crystal molecules therebetween. The isolation layers 363, 372 are optional. Preferably, the patterned layer 374 is designed such that the pattern forms an array of discrete addressable regions 374a, 374b, 374c, 374d. Preferably, there are as many discrete regions of ITO as there are wavelength channels in the input multiplexed optical signal. The patterned layer 374 and the continuous reflective layer 362 form the opposing electrodes to which a voltage is applied to selectively reorient regions of the liquid crystal 355. The fixed waveplate 359 is provided to normally bias the liquid crystal modulator 350 such that when no voltage is applied the modulator 350 functions as a zero-wave plate and does not alter the polarization of light, for either the first or second pass therethrough.

In one embodiment, the continuous reflective layer 362 is replaced with a planar mirror (not shown) disposed adjacent the transparent substrate 361 and a continuous ITO electrode positioned where the reflective electrode 362 is shown. Optionally, a polarizer (not shown) is provided in front of the fixed waveplate 359 to improve blocking efficiency.

The operation of the wavelength blocker 300 is described by way of the following example. An optical signal carrying channels having central wavelengths $\lambda_1, \lambda_2, \ldots \lambda_4$ is launched through the first port P1 of the circulator 310, where it is circulated to port P2, and incident on the GRIN lens. The collimated beam of light is passed through the polarization diversity unit (not shown) to produce two vertically displaced sub-beams of light having a same predetermined polarization state. Each sub-beam of light is transmitted to the spherical mirror 330, where it is reflected and focussed on the diffraction grating 340. Each sub-beam of light is spatially dispersed (i.e., demultiplexed) according to wavelength in a dispersion plane parallel to FIG. 3a. Each spatially dispersed sub-beam of light is transmitted back to the spherical mirror 330, and is transmitted towards the discrete array of controllable elements 350. Each dispersed sub-beam of light passes through liquid crystal modulator such that it is distributed over the array of discrete regions of conducting ITO 374a, 374b, 374c, 374d. In particular, each sub-beam is distributed such that the portion of the sub-beam corresponding to about $\lambda_1$ is passed through discrete region 374a, the portion corresponding to about λ2 is passed through discrete region 374b the portion corresponding to about $\lambda_3$ is passed through discrete region 374c, and the portion corresponding to about λ4 is passed through discrete region 374d. If no voltage is applied to any of the discrete regions 374a, 374b, 374c, or 374d each sub-beam will pass through the liquid crystal modulator 350, and will be reflected off electrode 354 back to the spherical mirror 330 and the diffraction grating 340, where it is combined to form an output sub-beam of light. The two output sub-beams of light are combined in the polarization diversity unit to form a single output signal, which is returned to the circulator 310 and output the output port P3.

When a voltage is applied across one of the electrodes, for example 374c, then the liquid crystal near that region will alter the polarization of the portion of light corresponding to about $\lambda_3$ by a predetermined amount for each sub-beam. For an applied voltage for which the net functionality of the cell (including any fixed waveplate) is a half-wave plate, the polarization of the reflected light exiting the cell is orthogonal to that of the incident light. When this light is passed back to the polarization diversity unit, it is effectively blocked. Accordingly, the portion of light of each sub-beam that is passed through the unactivated regions 374a, 374b, and 374b is transmitted through the components with no significant change as described above. In particular, each portion of the sub-beams corresponding to the express channels is reflected back to the spherical mirror 330 as two dispersed beams of light corresponding to channels with central wavelengths $\lambda_1$–$\lambda_2$ and $\lambda_4$, respectively. The dispersed beams of light are reflected to the diffraction grating 340 and combined to form two multiplexed sub-beams of light. The two multiplexed sub-beams of light, each of which includes wavelengths $\lambda_1$–$\lambda_2$ and $\lambda_4$, are transmitted to spherical mirror 330, are reflected to GRIN lens 320, and are combined in the polarization diversity unit (not shown) to form a single output signal, which is output port P3.

Advantageously, the discrete array of controllable elements 350 is essentially transparent to the express channels and the wavelengths between adjacent express channels that pass through the wavelength blocker. Moreover, the array 350 is designed such that the express channels and the wavelengths between express channels pass through substantially the same environment, an in particular, the same polarization environment. Since there is no spectral selection via pixelation or other discretisation of the spectrum, each of the channels is essentially unfiltered. Furthermore, since the discrete array of controllable blocking elements is optionally designed to provide an element for every spectral channel that is passed such that a full reconfigurability of the plurality of channels is obtained. Notably, the choice of four channels is arbitrarily chosen for exemplary purposes. More or fewer channels are also within the scope of the instant invention.

In another embodiment the discrete array of controllable blocking elements is based on MEMs technology. The term MEMS, or Micro Electro-Mechanical Systems, refers to very small mechanical devices and systems constructed using photolithography and various deposition and etching techniques. Generally, MEMS range in size from a few microns to a few millimeters. Motors, pivots, and rotating mirrors are optionally implemented using a number of MEMS microfabrication technologies, such as silicon surface micromachining, LIGA, silicon bulk micromachining, electro-discharge machining and others. MEMS tend to be rugged, respond rapidly, use little power, and are produced at large quantities at low cost owing to their planar lithographic fabrication process. The use of MEMS structures in optical switches is discussed in U.S. Pat. Nos. 5,960,133, 6,275,320, and 6,396,975, incorporated herein by reference.

In accordance with one embodiment of the instant invention, each element 52 of the array 50 of discrete wavelength blockers uses a pop-up mechanism to switch between a first position where it is in the optical path of the light 95 dispersed by the diffraction grating and a second position where it is out of the optical path of the light 95 dispersed by the diffraction grating. Examples of suitable pop-up structures 52 for use in the instant invention include edge pop-up, in plane pop-up, curled pop-up, and linear pop-up MEMS as shown in FIGS. 4a–d, respectively. Alternatively, the array of discrete wavelength blockers 50 uses a pop-down mechanism. The pop-up or pop-down MEMS structures are designed to be either light absorbing or light reflective. Some examples of suitable actuation of the pop-up or pop-down MEMS devices include magnetic, electrostatic, thermal, and acoustic actuators. For example, in the embodiment shown in FIG. 4D, the linear pop-up MEMS 52 is thermally actuated. In particular, each discrete blocking element 52 is coupled to a beam, which arches when heated, and hence drives the blocking element 52 in the direction of the arch.

Referring to FIG. 5a–c, a wavelength blocker utilizing a MEMS array is shown. The wavelength blocker 500 includes an input optical fibre 505, a concave diffraction grating 520, an array of discrete wavelength blockers, 550, and a flat continuous mirror 560. The concave diffraction 520 grating spatially disperses the input multiplexed beam of light according to wavelength and also provides focussing/collimating for the system. Preferably, the discrete array of wavelength blockers 550 is positioned at a focal plane of the concave diffraction grating 520. The array of discrete wavelength blockers 550 uses a MEMS device, wherein each discrete element is a linear pop-up having an absorbing surface. Of course, other MEMS devices, such as the pop-ups discussed heretofore, are alternatively used. Optionally, a polarization diversity unit (not shown) as discussed above, is coupled to the input optical fibre 505 to eliminate the effects of the polarization dependence of the grating efficiency.

The operation of the wavelength blocker 500 is described by way of the following example. An optical signal carrying channels having central wavelengths $\lambda_1$, $\lambda_2$, . . . $\lambda_8$ is launched through the input fibre 505 and is transmitted to concave diffraction grating 520. The diffraction grating spatially disperses (i.e., demultiplexes) the beam of light according to wavelength in a dispersion plane parallel to FIG. 5a. The spatially dispersed beam of light is collimated and transmitted towards the continuous reflector 560. When each of the discrete elements of the array 550 is in an "OFF" state, as in the side view depicted in FIG. 5b, the dispersed beam of light passes over the array 550 without contacting any part of the array 550, is reflected off the continuous reflector 560, and is reflected back to the diffraction grating 520 where it is recombined and output the input fibre 505. When one of the discrete elements of the array 550 is in an "ON" or popped-up state, as shown in the side view depicted in FIG. 5c, the dispersed beam is cut (i.e., a portion removed) by the popped-up element. In particular, a portion of the dispersed beam corresponding to the channel to be dropped, e.g., having centre wavelength $\lambda_3$, is physically blocked or absorbed, while the portion of the beam corresponding to the express channels passes over the discrete array 550 without being blocked or coming in contact with the array 550.

Optionally, the express channels are passed through a circulator (not shown) to separate the input and output signals. Alternatively, a folding mirror (not shown) is positioned such that it is out of the optical path of light transmitted to the mirror 560, but intercepts light reflected from the mirror 560 and directs it to a separate output port.

Advantageously, the discrete array of controllable blocking elements is optionally designed to provide an element for every spectral channel that is passed such that a full reconfigurability of the plurality of channels is obtained. Furthermore, since the blocking elements are discrete they only affect predetermined wavelengths. Notably, the choice of eight channels is arbitrarily chosen for exemplary purposes. More or fewer channels are also within the scope of the instant invention.

Figure 6A:
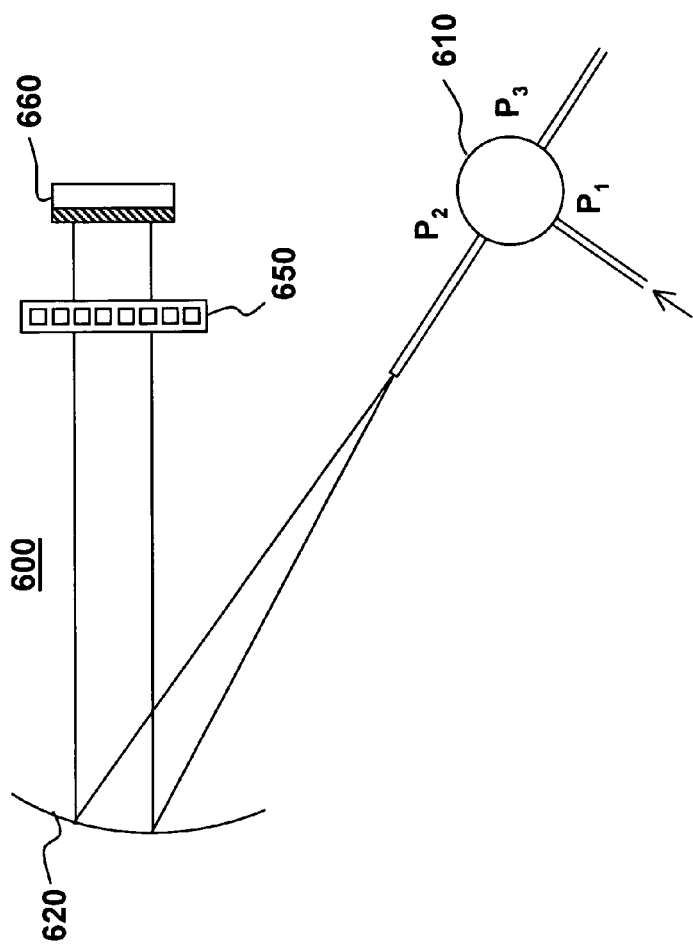
FIG. 6a is a schematic diagram of a wavelength blocker in accordance with another embodiment of the instant invention having add/drop functionality.

Referring to FIG. 6a, there is shown a wavelength blocker in accordance with the instant invention capable of add/drop. The wavelength blocker 600 includes a first circulator 610, a concave diffraction grating 620, an array of discrete wavelength blockers 650, a flat continuous mirror 660, and a second circulator 680 (which is not visible in FIG. 6a because it is behind the first circulator). The concave diffraction 620 grating spatially disperses the input multiplexed beam of light according to wavelength and also provides focussing for the system. Preferably, the discrete array of wavelength blockers 650 is positioned at a focal plane of the concave diffraction grating 620. The array of discrete wavelength blockers 650 incorporates a MEMS device, wherein each discrete element is an in-plane pop-up having a reflecting surface. Of course, other reflective MEMS devices, such as the pop-ups discussed heretofore, are alternatively used.

Figure 6B:
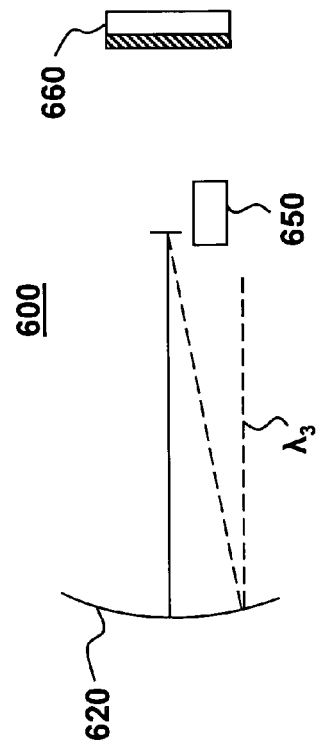
FIG. 6b is a side view of the wavelength blocker shown in FIG. 6a in a dropping mode of operation.

The operation of the wavelength blocker 600 is described by way of the following example. An optical signal carrying channels having central wavelengths $\lambda_1, \lambda_2, \ldots \lambda_8$ is launched in P1 of the first circulator, exits via P2, and is transmitted to concave diffraction grating 620. The diffraction grating spatially disperses (i.e., demultiplexes) the beam of light according to wavelength in a plane parallel to FIG. 6a. The spatially dispersed beam of light is collimated and transmitted towards the continuous reflector 660. When each of the discrete elements of the array 650 is in an "OFF" state, the dispersed beam of light passes over the array 650 without contacting any part of the array 650, is reflected off the continuous reflector 660, and is reflected back to the diffraction grating 620 where it is recombined and transmitted back to the circulator 610, where it is output P3. When one of the discrete elements of the array 650 is in an "ON" or popped-up state, as shown in the side view depicted in FIG. 6b, the dispersed beam is cut (i.e., a portion removed) by the popped-up element. In particular, a portion of the dispersed beam corresponding to the channel to be dropped, e.g., having centre wavelength $\lambda_3$, is reflected in a downwards direction, while the portion of the beam corresponding to the express channels passes over the discrete array 650 without being blocked or coming in contact with the array 650. The downward reflected portion, e.g., having centre wavelength $\lambda_3$, is reflected back to the diffraction grating 620, and is redirected to P2 of the second circulator 680 where it is circulated and output P3 of the second circulator 680. Optionally, an add signal having the same center wavelength as the drop channel, e.g. $\lambda_3$, is simultaneously input P1 of the second circulator 680 where it is circulated to P2 of the second circulator 680 and is sequentially transmitted to the diffraction grating 620, the discrete array 650, the diffraction grating 620, P2 of the first circulator 610, and is output P3 with the express channels.

Advantageously, the discrete array of controllable blocking elements is optionally designed to provide an element for every spectral channel that is passed such that a full reconfigurability of the plurality of channels is obtained. Furthermore, since the blocking elements are discrete they only affect predetermined wavelengths. Notably, the choice of eight channels is arbitrarily chosen for exemplary purposes. More or fewer channels are also within the scope of the instant invention.

In yet another embodiment, the array of discrete wavelength blockers uses Frustrated Total Internal Reflection (FTIR) technology. Total internal reflection (TIR) is the phenomenon whereby light traveling at an angle in a dense medium, such as glass, is perfectly reflected by the interface between the dense medium and a less dense medium, such as air. This perfect reflection or total internal reflection may be frustrated by bringing a second another component constructed from a similar dense medium into proximal contact with the first medium, such that the light traveling in the dense medium passes through the reflecting surface and travels into the second component. The use of FTIR in switches is discussed in greater detail in U.S. Pat. Nos. 5,875,271, 6,438,283, and 6,433,911, incorporated herein by reference.

Figure 7A:
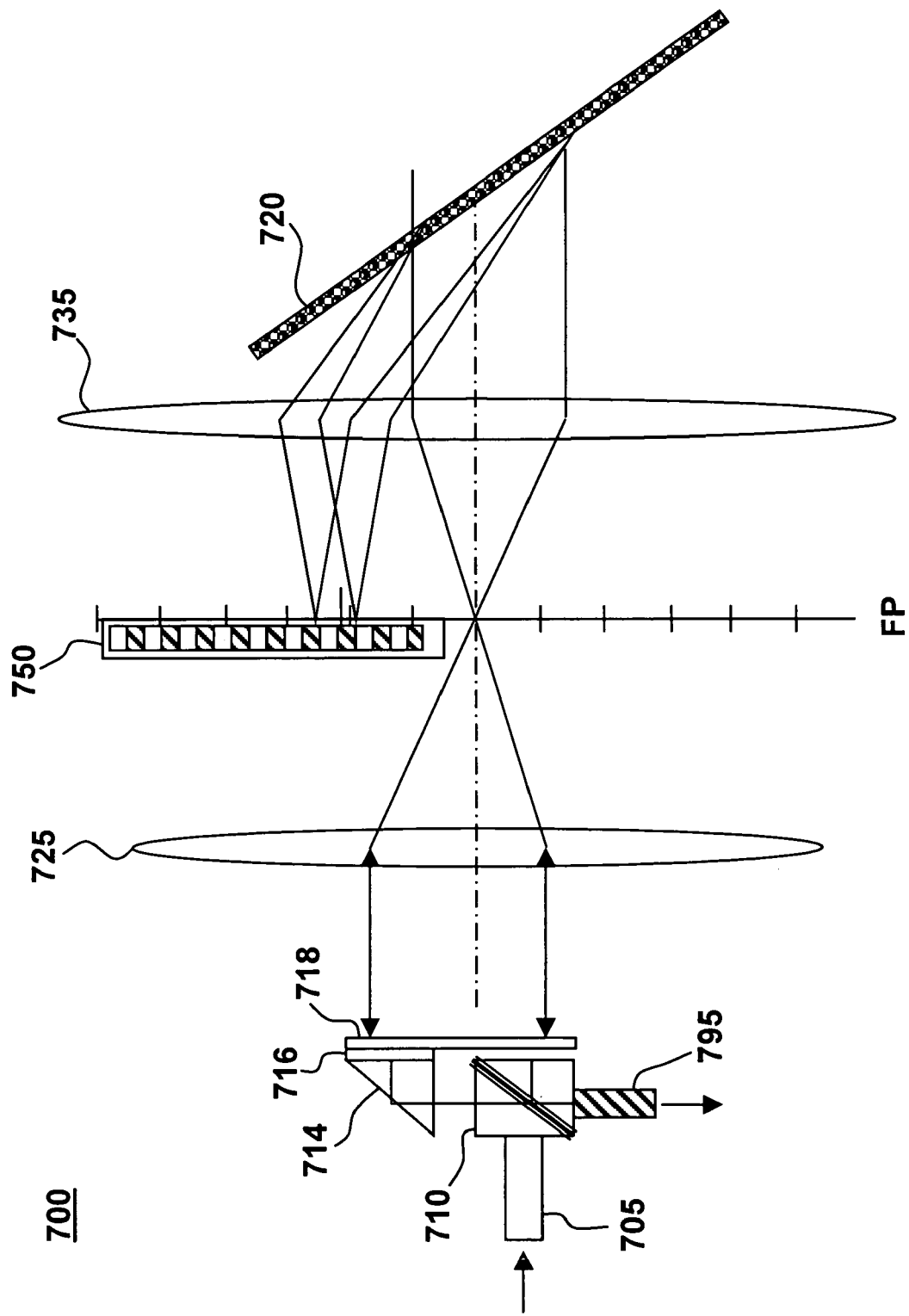
FIG. 7a is a schematic diagram of a wavelength blocker in accordance with yet another embodiment of the instant invention.

Referring to FIG. 7, there is shown a schematic diagram of a wavelength blocker in accordance with another embodiment of the invention. The wavelength blocker 700 includes an input GRIN lens 705, a polarization beamsplitter 710, a first collimating/focussing lens 725, a second collimating focussing lens 735, a right angle prism 714, a half-wave plate 716, a Faraday rotator 718, a diffraction grating 720, an array of discrete blocking elements 750, and an output GRIN lens 795. Preferably, the focal plane of the first lens 725 and the second lens 735 are coincident. The second lens 735 provides angles-to-offset (ATO) transformations such that differences in angle of the optical path produced by the diffraction grating 720 translates to a lateral offset at the array of discrete blocking elements 750. Alternatively, the Faraday rotator 718 is moved to the shared focal point of the first 725 and a second 735 collimating focussing lenses.

Figure 7B:
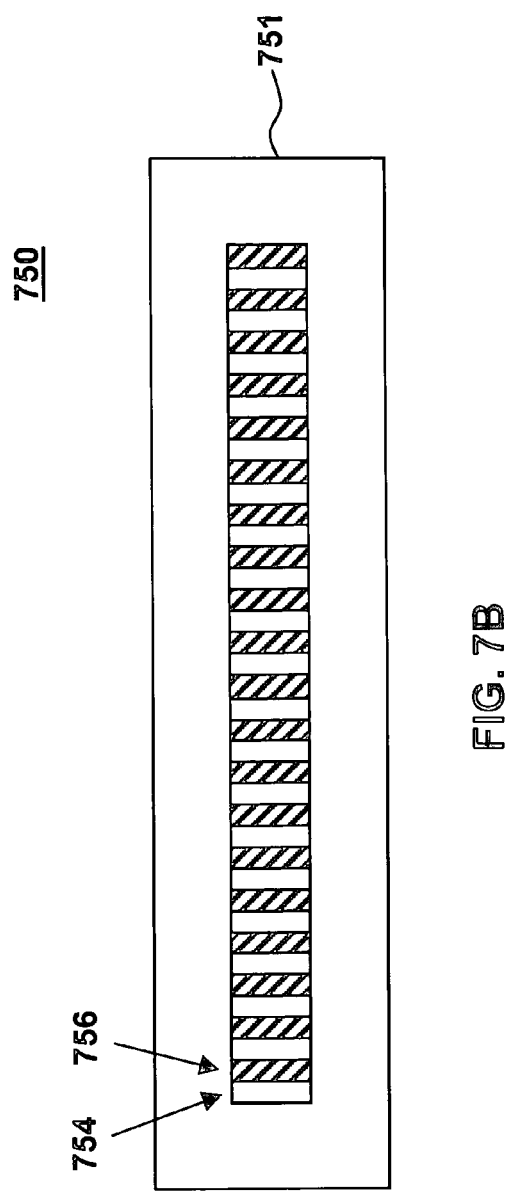
Figure 7C:
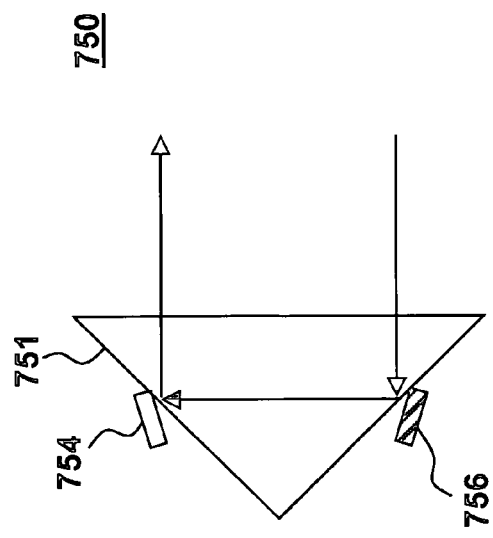

FIGS. 7b,c illustrate the blocking array 750 in greater detail. The array 750 includes a 90 degree reflecting prism 751 having its 90 degree apex in the plane of FIGS. 7a–b, and perpendicular to the plane of FIG. 7c. A first array of discrete switches (shown as solid elements 756) is provided on the lower surface of 90 degree reflector 751, while a second array of discrete switches (shown as striped elements 754) is provided on the upper surface of the 90 degree reflector 751. Notably, the elements in the first 756 and second 754 arrays alternate in horizontal placement as shown in FIG. 7b (i.e., the striped elements of the second array 754 are actually being viewed through the transparent reflector 751, while the solid elements of the first array 756 are atop the reflector 751). This staggering of the frustrating elements 754,756 between the two reflecting surfaces of the 90 degree reflecting prism 751 allows each blocking element to be optionally designed to be large enough to block the entire wavelength channel and such that there is sufficient room for the drivers. Preferably, the combination of the first 756 and second 754 arrays provides as many elements as there are channels of the telecommunication system. Preferably, each element in the first 756 and second 754 arrays is movable between a first position where it is disposed away from the reflector 591 such that it does not interfere with the total internal reflection, and a second position where it is in close proximity to the reflector such that it frustrates, or destroys, the internal reflection in that region. Alternatively, both of the first 756 and second 754 arrays are disposed on a same surface of the 90 degree reflector (i.e., they are not staggered).

The operation of the wavelength blocker 700 is described by way of the following example. An optical signal carrying channels having central wavelengths $\lambda_1, \lambda_2, \ldots \lambda_4$ is launched from the lens 705 into polarization beamsplitter 710 where it is separated into two different sub-beams of light having orthogonal polarizations. One sub-beam of light is transmitted straight through the beamsplitter 710, has its polarization rotated by 45 degrees by the Faraday rotator 718, and is transmitted directly to lens 725. The other sub-beam of light is reflected into right angle prism 714 where it is reflected through half-wave plate 716 and Faraday rotator 718. The half-wave plate 716 rotates the polarization of the sub-beam of light by 90 degrees, while the Faraday rotator rotate the polarization of the sub-beam passing through it by 45 degrees, such that both sub-beams have a same polarization state at the lens 725. In combination with lens 735, lens 725 relays both sub-beams to the diffraction grating 720. The diffraction grating 720 disperses each sub-beam of light according to wavelength and reflects the dispersed beams to the blocking array 750. Since each portion of the sub-beam corresponding to a different wavelength will be diffracted to a different extent (i.e., will leave the grating with a different reflection angle), the ATO lens 735 directs each wavelength component of each sub-beam to a different element of the blocking array 750 along parallel optical paths. Advantageously, this set up allows the array 750 to function as a planar mirror in the plane of FIG. 7a, thus preserving the loop setup and allowing the express channels to return along a different optical path to the diffraction grating 720. More specifically, the express channels of one sub-beam of light are transmitted back to the diffraction grating 720 along the same optical path that the other sub-beam of light followed to the array 750. The diffraction grating 720 recombines the dispersed sub-beams of light and transmits them back through the lenses 725 and 735 to the polarization diversity optics 710, 714. Since the Faraday rotator introduces a net 90 degree change in polarization, the combined express signals are output lens 795. Optionally, the portion of the dispersed beams of light blocked by FTIR is tapped and monitored with a detector. Further optionally, an optical signal having the same wavelength as the blocked beam is input into the wavelength blocker 700 via a frustrating element.

Figure 8B:
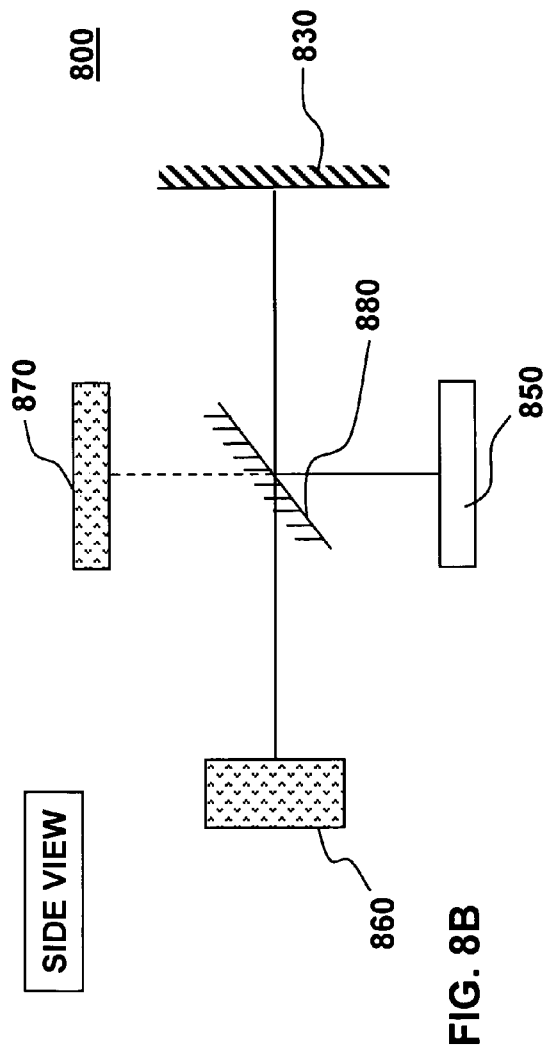
FIG. 8b is a side view of the wavelength blocker shown in FIG. 8b.

Referring to FIGS. 8a and 8b, there is shown a wavelength blocker in accordance with another embodiment of the instant invention. The wavelength blocker 800 includes an input port 805, a spherical mirror 830, a diffraction grating 840, a discrete array of controllable elements 850 (not shown in FIG. 8a), a first detector array 860, a second detector array 870, and a partially reflective mirror 880. Preferably, each of the input port 805, diffraction grating 840, and discrete array of controllable elements 850 is disposed substantially at the focal plane FP of the spherical mirror 830. Preferably, each of the first 860 and second 870 detector arrays has as many elements as the discrete array of controllable elements. Preferably, the discrete array of controllable elements uses either LC or MEMS elements. Optionally, a circulator (not shown) is provided to separate input and output signals. Further optionally, a polarization diversity unit (not shown) is coupled to the input port 850 to convert the input beam of light into two orthogonally polarized sub-beams of light, or, two sub-beams of light having parallel polarizations. For example, polarization diversity units including half-wave plates and/or birefringent crystals such as those disclosed in U.S. Pat. Appl. No. 20020009257 incorporated herein by reference, are known in the art and are not discussed further.

The operation of the wavelength blocker 800 is described by way of the following example. An optical signal carrying a plurality of wavelength channels is launched from the input port 805 and is transmitted to the spherical mirror 830, where it is reflected and focussed on the diffraction grating 840. The diffraction grating 840 disperses the beam of light according to wavelength in a plane parallel to FIG. 8a. The dispersed beam of light is transmitted back to the spherical mirror 830, and is transmitted towards the partially reflective mirror 880. The partially reflective mirror redirects most of the optical signal (for example, 80–99%) to the discrete array of controllable elements 850 (not shown in FIG. 8a) where predetermined channels are blocked (i.e., absorbed or reflected) or attenuated. The express channels leaving the discrete array of controllable elements 850 is returned to the partially transmissive mirror 880, where most of the optical signal (for example, 80–90%) is reflected to the spherical mirror, is redirected to the diffraction grating 840, is reflected to the spherical mirror again, and is output optical fibre 805.

The small amount of the input optical signal that is passed through the reflector 880 during the first pass is transmitted to the first detector array 860, where each portion of the dispersed beam of light corresponding to a different wavelength channel is incident on a separate element of the detector array 860, to provide an indication of the intensity of each wavelength channel in the input optical signal. Similarly, the small amount of express optical signal that is transmitted through the reflector during the second pass is transmitted to the second detector array 870, where each portion of the dispersed beam of light corresponding to the different wavelength channels of the express signals is incident on a separate element of the detector array 870 to provide an indication of the intensity of each the express and/or attenuated wavelength channels.

Alternatively, the partially transmissive mirror is angled to direct the express channels to a separate output port (not shown) rather than back the input port 805. Advantageously, allowing one detector array to measure the input light (on a per channel basis), while the second detector measures the light output after manipulation by the LC or MEMS array, the functionality of the device improves with very little change in complexity. In particular, this embodiment provides a wavelength blocker that functions as a channel power monitor.

In various embodiments disclosed heretofore, the array of discrete blockers is optionally replaced with an array used in one of the other embodiments. In particular, embodiments where the array of discrete blocking elements discussed with respect to FIGS. 4a–d, 5a–c, and 7b–c is used in the wavelength blocker depicted in FIG. 3a, are within the scope of the instant invention. Similarly, the array of discrete blocking element discussed with reference to FIG. 3b is suitable for the wavelength blockers depicted in FIGS. 5a and 7a.

In addition, in each of the embodiments disclosed heretofore, the reflective collimating/focusing optics are optionally replaced with lenses, the reflective diffraction grating is optionally replaced with a prism or other transmissive grating, and/or polarization sensitive input optics, half-wave plates, and/or dichroic polarizers are included. Optionally, each of the arrays in the above embodiments is designed to block selective wavelength channels of the input optical signal only partially.

Advantageously, the wavelength blockers discussed heretofore are able to attenuate and/or block any number of wavelengths and are able to be reconfigured to select alternate wavelengths in milliseconds. The all-optical design provides remote, dynamic channel reconfiguration and offers significant cost savings when compared to OEO devices. In particular, wavelength blockers according to the instant invention are transparent to wavelength, modulation format, and modulation frequency and operate at higher speeds than OEO methods.

Furthermore, wavelength blockers including the reflective designs described heretofore are compact and relatively inexpensive. In particular, designing the array of discrete elements to operate in a reflective mode allows the same optics to be used to and from the array, thus reducing the number of components and alignment problems.

Notably, in each of the embodiments discussed above the discrete array of elements is essentially pixellated in a negative sense. In other words, the spaces between the individual pixels are not seen, except by the predetermined wavelengths to be notched out. In yet other words, the express channels will experience a continuous environment whereas the drop channels experience a discrete environment. This is in contrast to prior art switches based on conventional MEMS and LC modulators, where the express channels experience a pixellated environment.

Figure 9:
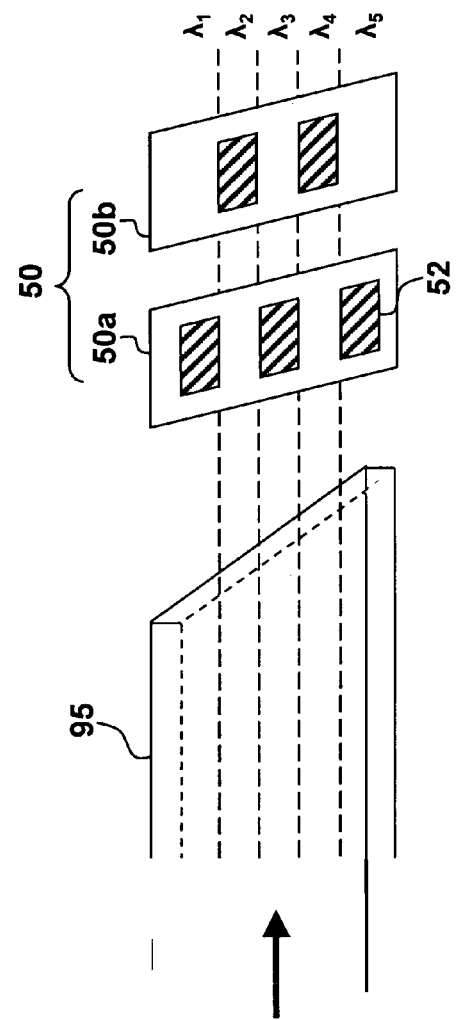
FIG. 9 is a schematic diagram of a blocking array for use in a wavelength blocker in accordance with an embodiment of the instant invention.

Since the wavelength blockers described heretofore are essentially negatively pixellated, it is possible that there will be incomplete blocking between adjacent channels and/or incomplete blocking of channels. To ensure complete blocking of channels and/or adjacent channels, the elements 52 used for blocking adjacent channels are optionally constructed on separate arrays such that they slightly overlap or at least reduce the gap. For example, one array 50a is optionally positioned behind the other 50b as shown in with the MEMS pop-up array 50 in FIG. 9 or the TIR array shown in FIG. 7a.

The embodiments of the invention described above are intended to be exemplary only. Numerous other embodiments may be envisaged without departing from the spirit and scope of the invention. For example, the instant invention is not limited to the type of discrete arrays disclosed. In particular, other types of liquid crystals and other mechanically moving arms that swing or swivel in and out of the optical path are within the scope of the instant invention.

What is claimed is:

1. A wavelength blocker comprising:
an input port for launching an input beam of light having a plurality of wavelength channels with distinct center wavelengths;
first dispersing means disposed for spatially dispersing the input beam of light in accordance with wavelength into the plurality of wavelength channels;
an array of discrete, independently addressable elements, each independently addressable element operable between a first state resulting in a blocked channel, and a second state resulting in an unblocked channel;
second dispersing means for receiving unblocked channels and for producing a single multiplexed beam of light therefrom; and
an output port for outputting the multiplexed beam of light,
wherein the array of independently addressable elements includes a polarization rotating device for rotating the polarization of the blocked channels to be orthogonal to the unblocked channels; and a continuous reflecting surface for reflecting the unblocked channels to the second dispersing means, whereby all unblocked channels of light are passed to the output port, including light between adjacent unblocked wavelength channels.

2. A wavelength blocker according to claim 1, wherein the first and second dispersing means comprises a same diffraction grating.

3. A wavelength blocker according to claim 2, wherein each element of the array of independently addressable elements is deposited on a transparent substrate, the substrate disposed such that it is perpendicular to a dispersion plane of the diffraction grating.

4. A wavelength blocker according to claim 2, comprising a spherical mirror having a focal plane, wherein the diffraction grating and continuous reflecting surface are disposed substantially in the focal plane.

5. A wavelength blocker according to claim 2, comprising a partially transmissive mirror optically disposed between the diffraction grating and the array of independently addressable elements disposed for tapping a portion of the beam of light before selected channels encounter the array of independently addressable elements.

6. A wavelength blocker according to claim 5, wherein the partially transmissive mirror is also disposed for tapping a portion of the beam of light after the selected channels encounter the array of independently addressable elements.

7. A wavelength blocker according to claim 6, comprising a first detector array for detecting an intensity of each channel of the input beam of light before the beam of light encounters the array and a second detector array for detecting an intensity of each channel of the beam of light after the beam of light encounters the array.

8. A wavelength blocker according to claim 2, comprising a partially transmissive mirror optically disposed between the diffraction grating and the array of independently addressable elements disposed for tapping a portion of the beam of light after selected channels encounter the array of independently addressable elements.

9. A wavelength blocker according to claim 1, wherein the polarization rotating device comprises a liquid crystal device.

10. A wavelength blocker according to claim 9, wherein the polarization rotating device comprises a first and second transparent electrodes with a liquid crystal layer therebetween, and wherein the continuous reflective surface is adjacent to the second transparent electrode.

11. A wavelength blocker according to claim 9, wherein the polarization rotating device comprises a liquid crystal device having a continuous reflective electrode, a liquid crystal layer, and an addressable transparent electrode.

12. A wavelength blocker according to claim 1, wherein the polarization rotating device is designed to not affect the polarization of the input beam of light including wavelengths between adjacent wavelength channels in the absence of an applied voltage.

13. A wavelength blocker according to claim 1, comprising a polarizer optically coupled to the polarization rotating device.

14. A wavelength blocker according to claim 1, wherein the continuous reflective surface is a planar mirror.

15. A wavelength blocker according to claim 1, comprising collimating and focusing optics for allowing each of the channels of light to be essentially focused at the array of independently addressable elements.

16. A wavelength blocker according to claim 15, wherein the collimating and focusing optics include at least one of a GRIN lens, a spherical mirror, a concave diffraction grating, and a pair of lenses.

17. A wavelength blocker according to claim 1, wherein the wavelength blocker has a free-space design.

18. A wavelength blocker according to claim 1, comprising a polarization diversity unit for separating the input beam of light into a pair of polarized sub-beams of light, for providing the pair of polarized sub-beams to the dispersive element and the array of independently addressable elements, and for combining the two polarized sub-beams prior to being output the output port, while blocking the blocked channels.

19. A wavelength blocker according to claim 18, wherein the polarization diversity unit comprises a birefringent element and at least one half-wave plate.

20. A wavelength blocker according to claim 1, wherein each independently addressable element is designed for variably blocking a corresponding channel of light to produce a variably attenuated channel of light.

21. A wavelength blocker according to claim 1, wherein the array of independently addressable elements is negatively pixellated.

22. A wavelength blocker comprising:
an input port for launching an input beam of light having a plurality of wavelength channels;
first dispersing means disposed for spatially separating the input beam of light into a plurality of sub-beams of light, each sub-beam of light corresponding to a different wavelength channel;
a first array of discrete, independently addressable elements, each independently addressable element for selectively blocking a sub-beam of light from the plurality of sub-beams;
second dispersing means for receiving unblocked sub-beams of light and for producing a single multiplexed beam of light therefrom;
an output port for outputting the multiplexed beam of light, wherein the array is designed such that all unblocked sub-beams of light are passed to the output port, including light between adjacent unblocked wavelength channels; and
a second array of independently addressable elements optically disposed behind the first array, whereby adjacent independently addressable elements of each of the first and second arrays are for blocking alternating communication channels of the input beam of light.

23. A wavelength blocker according to claim 22, wherein the first and second dispersing means comprises a same diffraction grating; and wherein each of the first and second arrays of independently addressable elements comprises a MEMS device disposed between a continuous reflecting surface and the diffraction grating.

24. A wavelength blocker according to claim 22, wherein the first and second arrays of independently addressable elements comprises a MEMS device.

25. A wavelength blocker according to claim 24, wherein each addressable element comprises one of an edge pop-up, an in-plane pop, a curled pop-up, and a linear pop-up mechanism.

26. A wavelength blocker according to claim 22, wherein each addressable element comprises a blocking element movable between a first position where it is in a dispersion plane of the dispersive element and a second position where it is out of the dispersion plane.

27. A wavelength blocker according to claim 22, wherein each element of the first and second arrays are coupled to a substrate, the substrate disposed such that it is out of the optical path of the plurality of sub-beams of light.

28. A wavelength blocker according to claim 27, wherein the substrate is parallel to the dispersion plane.

29. A wavelength blocker according to claim 22, wherein each addressable element comprises a blocking element movable between a first position where it is positioned to substantially intercept an optical path of a sub-beam of light and a second position where it is positioned to substantially avoid the plurality of sub-beams of light.

30. A wavelength blocker comprising:
an input port for launching an input beam of light corresponding to an input optical signal having a plurality of wavelength channels;
first dispersing means disposed for dispersing the input beam of light into a plurality of sub-beams of light, each sub-beam of light corresponding to a different wavelength channel;
an array of independently addressable elements, each independently addressable element for selectively blocking a different sub-beam of light;
second dispersing means for receiving unblocked sub-beams of light and for producing a single multiplexed beam of light therefrom; and
an output port for outputting an output optical signal corresponding to the single multiplexed beam of light,
wherein the array of independently addressable elements includes a polarization rotating device for rotating the polarization of the blocked channels relative to the unblocked channels; and a continuous reflecting surface for reflecting the unblocked sub-beams to the second dispersing means, whereby substantially no loss of signal between adjacent unblocked wavelength channels is observed in the output signal relative to the input signal.

31. A wavelength blocker comprising:
a first optical port for launching an input beam of light;
a spherical mirror having a focal plane for receiving the input beam of light launched from the first optical port, and for reflecting it in a substantially backwards direction;
a dispersive element disposed substantially at the focal plane of the spherical mirror for receiving the beam of light from the spherical mirror, and for producing a dispersed beam of light which is transmitted back to the spherical mirror;
an array of discrete blocking elements disposed substantially at the focal plane of the spherical mirror, each discrete blocking element operable between a first state which causes a portion of the dispersed beam of light to be dropped, and a second state which causes the portion of the dispersed beam of light to be passed; and
a reflector having a continuous reflecting surface for reflecting the passed portion of the dispersed beam of light back to the spherical mirror and the dispersive element such that it is output via one of the first optical port and a second optical port,
wherein regions between blocking elements in the first state are substantially transparent to the input beam of light.

* * * * *